FESSLER & BETZ.
Hand-Seeder.
No. 64,755.
Patented May 14, 1867.
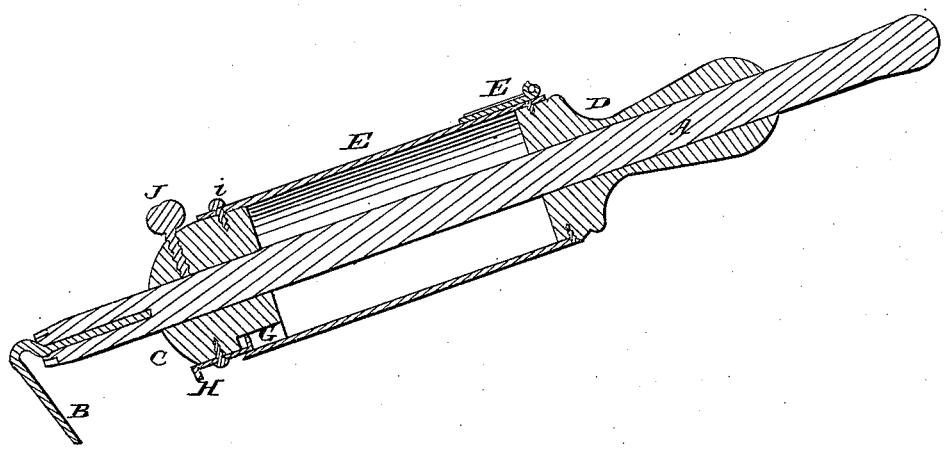
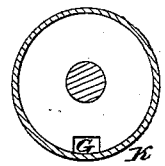
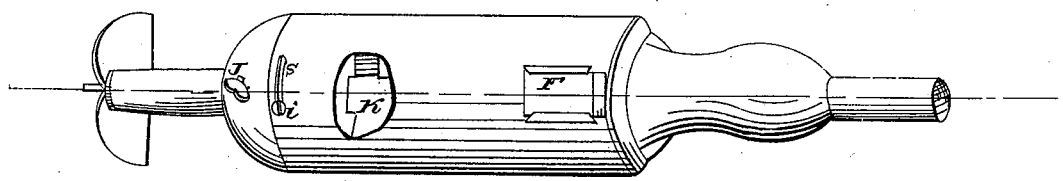

United States Patent Office.

HENRY FESSLER AND ISAAC E. BETZ, OF CANTON, OHIO.

Letters Patent No. 64,755, dated May 14, 1867.

IMPROVEMENT IN COMBINED HOE AND HAND-PLANTER.

*The Schedule referred to in these Letters Patent and making part of the same.*

TO ALL WHOM IT MAY CONCERN:

Be it known that we, HENRY FESSLER and ISAAC E. BETZ, of Canton, in the county of Stark, and in the State of Ohio, have invented certain new and useful Improvements in Corn-Planting Hoes; and do hereby declare that the following is a full, clear, and exact description thereof, reference being had to the accompanying drawings, and to the letters of reference marked thereon.

In the annexed drawings, making part of this specification, A represents any ordinary hoe-handle, provided with a hoe, B. C represents a cylindrical plug, which has an opening through its centre to receive the handle A, being provided with a set-screw, J, to confine it to the handle. E represents a hollow cylinder made of sheet metal, and provided at its upper end with a handle, D, which fits and is confined in said end. This handle is provided with an opening through it longitudinally, through which the hoe-handle A passes. The lower end of the cylinder E is closed by the plug C, said lower end fitting over the plug loosely, so that it can turn upon it. The plug C is provided with a seed receptacle or recess, G, and to correspond with this recess there is an opening, K, made in the side of cylinder E. The recess G is regulated as to size by the gauge-slide H. $i$ represents a pin or screw which passes through a slot, S, in the cylinder into the plug C. F represents a slide-door in the side of the cylinder, through which seed is introduced into said cylinder.

In using this seeding-hoe, the operator takes hold of the hoe-handle at its upper end with one hand, and the other hand he places upon the handle D of the cylinder. After making a suitable opening in the ground for his seed with the hoe, he partially revolves the cylinder E, causing the recess G of the plug to pass within the cylinder, where it fills with seed and then by partially revolving the cylinder back again, until the recess comes opposite the opening K, the grain drops out to the ground. The plug C being secured fast to the handle A, it becomes a matter of no consequence whether the handle A or the handle D is turned, as the same result is of course attained in either case. By removing the set-screw J this apparatus may be removed from the handle A, and by means of said screw it may be attached to any hoe-handle.

What we claim as new, and desire to secure by Letters Patent, is—

The cylinder E, as constructed, used in combination with the plug C, with its set-screw and seed-recess, and handles D and A, as and for the purpose specified.

In testimony that we claim the foregoing, we have hereunto set our hands and seal this 11th day of February, 1867.

HENRY FESSLER,
ISAAC E. BETZ.

Witnesses:
W. W. CLARK,
J. J. CLARK.